US012767088B2

(12) United States Patent
Braun

(10) Patent No.: US 12,767,088 B2
(45) Date of Patent: Oct. 20, 2026

(54) SEATBELT RETRACTOR FOR A VEHICLE SAFETY BELT

(71) Applicant: ZF AUTOMOTIVE GERMANY GMBH, Alfdorf (DE)

(72) Inventor: Marco Braun, Fellbach (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 232 days.

(21) Appl. No.: 18/247,756

(22) PCT Filed: Oct. 4, 2021

(86) PCT No.: PCT/EP2021/077284
§ 371 (c)(1),
(2) Date: Apr. 4, 2023

(87) PCT Pub. No.: WO2022/073924
PCT Pub. Date: Apr. 14, 2022

(65) Prior Publication Data

US 2023/0373433 A1 Nov. 23, 2023

(30) Foreign Application Priority Data

Oct. 7, 2020 (DE) .................... 10 2020 126 197.7

(51) Int. Cl.
*B60R 22/44* (2006.01)
*B60R 22/46* (2006.01)

(52) U.S. Cl.
CPC .............. *B60R 22/44* (2013.01); *B60R 22/46* (2013.01); *B60R 2022/4493* (2013.01); *B60R 2022/468* (2013.01); *B60R 2022/469* (2013.01)

(58) Field of Classification Search
CPC .............. B60R 20/56; B60R 2022/468; B60R 2022/4638
See application file for complete search history.

(56) References Cited

U.S. PATENT DOCUMENTS 6,419,272 B1 * 7/2002 Yamaguchi ............. F16D 41/12 297/480
10,196,034 B2 * 2/2019 Sasahara ................. B60R 22/34
(Continued)

FOREIGN PATENT DOCUMENTS

DE 102006000661 A1 7/2007
DE 102008011790 A1 9/2009
(Continued)

OTHER PUBLICATIONS

PCT Inernational Search Report for corresponding International Application Serial No. PCT/US2021/077284, mailed Mar. 23, 2022, pp. 1-4.

*Primary Examiner* — Marc Q Jimenez
*Assistant Examiner* — Ermia E. Melika
(74) *Attorney, Agent, or Firm* — Tarolli, Sundheim, Covell & Tummino LLP

(57) ABSTRACT

The invention discloses a belt retractor comprising a frame (10), a belt reel (12) which is arranged rotatably in the frame (10) and can receive a seat belt (14), at least one load limiter (16) which enables the belt reel (12), when it overcomes a braking torque provided by the load limiter (16), to rotate relative to the frame (10) so as to release seat belt (14), and a switchable clutch (26) including a switching cage (22) and coupling elements (24), wherein the switching cage (22) can be shifted by means of an actor (28) from an open position in which the coupling elements (24) are maintained disengaged from the belt reel (12) to a closed position in which the coupling elements (24) engage the belt reel (12). In order to achieve a compact design, the belt retractor includes an actuator (38) which is coupled to the actor (28) and a freewheel (40) which couples the switching cage (22) to the actuator (38) so that the actuator (38) can shift the switching cage (22) from the open position to the closed position.

17 Claims, 11 Drawing Sheets

(56) References Cited

U.S. PATENT DOCUMENTS

| | | | | |
|---|---|---|---|---|
| 2006/0237570 | A1* | 10/2006 | Takao | B60R 22/44<br>242/382 |
| 2015/0034753 | A1* | 2/2015 | Yamane | B60R 22/341<br>242/384.5 |
| 2019/0118763 | A1* | 4/2019 | Daeuber | B60R 22/4676 |
| 2020/0094775 | A1* | 3/2020 | Sautter | B60R 22/4676 |

FOREIGN PATENT DOCUMENTS

| | | | |
|---|---|---|---|
| DE | 102009013923 | A1 | 9/2010 |
| DE | 102017111398 | A1 * | 5/2017 |

* cited by examiner

SEATBELT RETRACTOR FOR A VEHICLE SAFETY BELT

RELATED APPLICATIONS

This application is a U.S. National Stage Application filed under 35 USC 371, claiming priority to Serial No. PCT/EP2021/077284, filed on 4 Oct. 2021; which claims priority from German Patent Application DE 10 2020 126 197.7, filed 7 Oct. 2020, the entireties of which are hereby incorporated herein by reference.

TECHNICAL FIELD

The invention relates to a belt retractor comprising a frame, a belt reel which is rotatably arranged in the frame and is adapted to receive a seat belt, at least one load limiter which enables the belt reel, when it overcomes a braking torque provided by the load limiter, to rotate relative to the frame so as to release seat belt, and a switchable clutch which has a switching cage and coupling elements, wherein the switching cage can be shifted, by means of an actor, from an open position in which the coupling elements are maintained disengaged from the belt reel into a closed position in which the coupling elements engage the belt reel.

BACKGROUND

A belt retractor of this type is known from DE 10 2017 111 398 A1. The switching cage is rotatably supported and has a radially projecting actuating pin. For being able to turn the switching cage from the open position to the closed position, there is provided a micro gas generator having a piston associated therewith which in turn engages the actuating pin.

When the switching cage is in the closed position and, accordingly, the load limiter is coupled to the belt reel, the switching cage is caught, when the belt reel rotates during a load limiting operation. Accordingly, also the actuating pin must be capable of rotating. For this purpose, the actuating pin and the micro gas generator are disposed so that the travel distance of the piston of the micro gas generator is a tangent to the trajectory of the actuating pin, and the actuating pin, while carrying out a complete revolution, immerses into a laterally disposed window of the micro gas generator.

It is the drawback of this design that a comparatively large axial space is required for the micro gas generator, the actuating pin and the switching cage.

SUMMARY

Therefore, it is the object of the invention to improve the belt retractor so that an axially compact design is resulting.

In order to achieve this object, according to the invention, there are provided an actuator that is arranged to be operable with the actor and a freewheel that couples the switching cage to the actuator so that the actuator can shift the switching cage from the open position into the closed position. The invention is based on the fundamental idea to achieve the free rotatability of the switching cage required to operate the load limiter by a simple and axially flat freewheel.

The freewheel allows the torque required to close the clutch to be transmitted in a direction of rotation. At the same time, the switching cage can rotate in one direction freely relative to the actuator. Conversely, the actuator can remain stationary after activation of the clutch so that no space must be provided for allowing the actuator to rotate about 360°, when the belt reel rotates while the clutch is closed.

Since no space needs to be provided in the circumferential direction, the actuator provided according to the invention may be designed to be longer in the radial direction than the known actuating pin. When the actuator is longer as compared to the known actuating pin, i.e., it is located remote from the belt reel, the actor may overlap the clutch further axially, as compared to the known prior art, so that an axially more compact design is resulting. The construction according to the invention thus is suited to save axial space in two ways, namely, on the one hand, by the axially flat freewheel and, on the other hand, by the actor axially overlapping the freewheel. Moreover, a less powerful actor can be used or, if an actor of continuously equal power is used, quicker operation can be obtained, as a higher torque can be achieved by a longer actuator.

When the actuator is a flat plate, an axially particularly flat design is obtained.

For a mechanically simple and reliable belt retractor, the switching cage may include at least one freewheel pawl which interacts with a freewheel toothing provided on the actuator. The combination of the switchable clutch and the freewheel allows the freewheel to run freely only after triggering of the actor. For this reason, a simple freewheel design can be chosen. When the at least one freewheel pawl and the freewheel toothing are formed to be complementary, a surface tension in the contact area decreases to a uniform level so that, ultimately, a flat design of the freewheel is achieved.

When the actuator is configured to symmetrically introduce a torque to the freewheel, the switching cage is prevented from eccentrically deforming or displacing. For example, the actuator may have two, three or more transfer points which are arranged regularly or at equal angular intervals, respectively, in the circumferential direction.

When the switching cage includes a plurality of freewheel pawls arranged uniformly in the circumferential direction, an unbalance of the switching cage is suppressed. Thus, the switching cage can rotate smoothly even at high speeds and angular accelerations.

A switching cage which is easy to manufacture contains plastic material or is even made of plastic material, and the freewheel pawls are preferably formed integrally with the switching cage.

In order to be reliable even at extremely high angular accelerations, the freewheel toothing may be configured to be undercut. The undercutting may involve, for example, the fact that the tooth head angularly projects from or leads the corresponding tooth root in the transfer direction of the freewheel. The undercutting may include a cavity in the tooth flank, for example. Said examples of undercutting may be combined. An undercutting further offers the advantage of causing the retaining force to be self-reinforcing, i.e., the retaining force is the higher, the higher the torque transmitted. In other words, the pawl is caught.

When the actuator is an adjusting collar, the latter can guide and transfer, due to its closed shape, the torque to be transmitted in a particular stable manner. When the adjusting collar encompasses the switching cage, a radially inner support of the adjusting collar is dispensed with so that space is saved, resulting in an even flatter design. Moreover, the freewheel toothing may be an internal toothing which extends along an inner opening of the adjusting collar so that many tooth-and-pawl contacts cause a high torque to be transmittable.

When the number of the freewheel pawls is identical to the number of teeth of the freewheel toothing, the transmittable torque is maximally high, as all freewheel pawls are simultaneously supporting. As a result, the axial width of the freewheel can be reduced so that a flat design is resulting.

For the benefit of an axially preferably flat belt tensioner, the actuator may be supported between a housing of the actor and the switching cage. The actuator thus is radially supported so that it is positioned concentrically to the switching cage and, secondarily, to the belt reel. The housing of the actor may be configured and arranged to transfer a reaction force of the actor. For this purpose, the housing of the actor can be tightly connected to the frame, such as by a screwed connection. When the housing of the actor both absorbs the reaction force of the actor and supports the actuator, it ensures the action force of the actor to be transmitted to the actuator with high efficiency. By the actuator being supported by the housing of the actor, undesired radially migrating movement of the actuator during triggering of the actor can be prevented: Hence, the actuator introduces the torque uniformly to the freewheel. The housing of the actor may also act as housing of the load limiter to protect the latter from penetrating dirt, for example.

When the housing of the actor includes a flat indentation in which the actuator is disposed, no separate housing is required for the actuator so that, on the one hand, fewer parts are used and assembled and, on the other hand, the belt retractor has an axially flatter design. The flat indentation can axially support and, resp., guide the actuator during a feed motion.

BRIEF DESCRIPTION OF THE DRAWINGS

Further advantages and features will be evident from the following description in combination with the attached drawings, wherein.

DESCRIPTION

Figure 1:
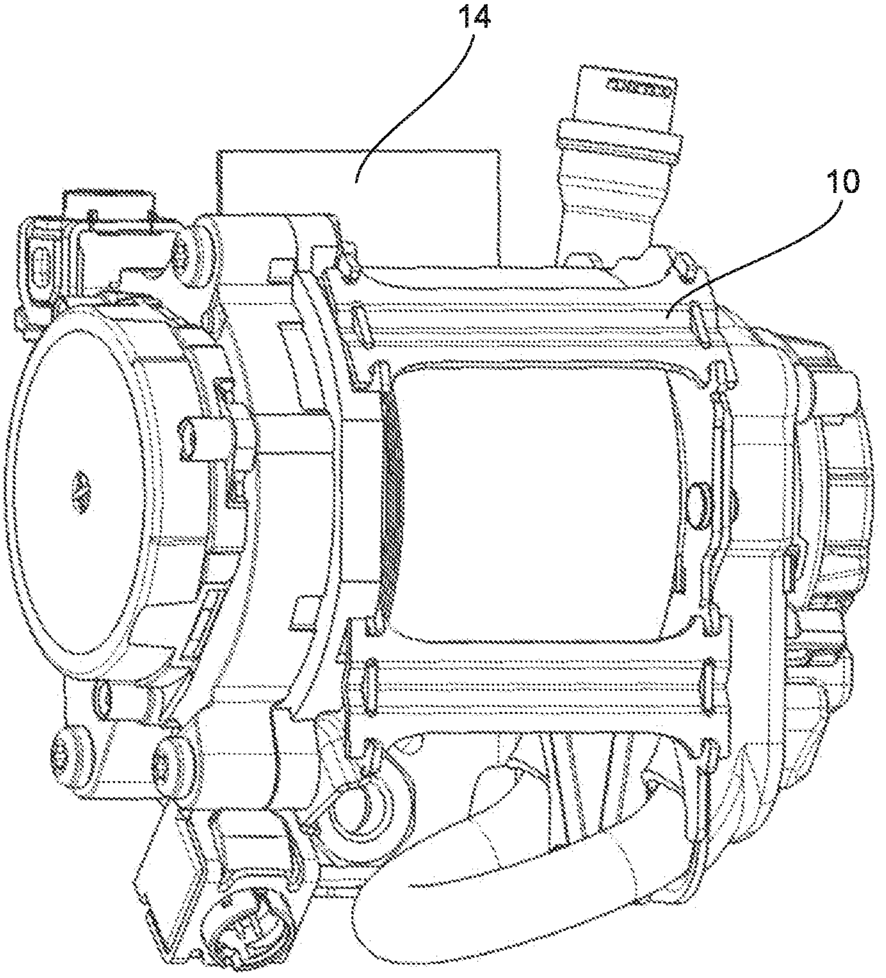
FIG. 1 shows a perspective view of a belt retractor according to the invention.
Figure 2:
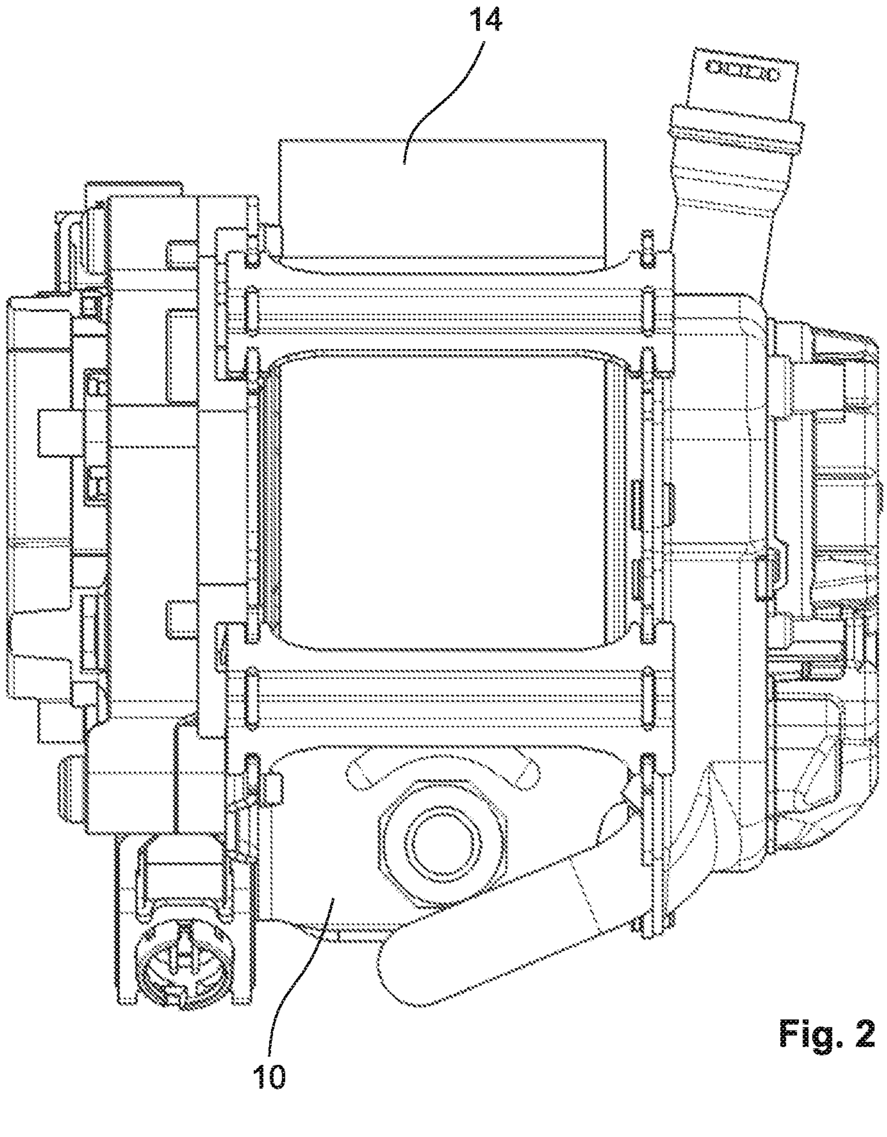
FIG. 2 shows a front view of the belt retractor of FIG. 1.
Figure 3:
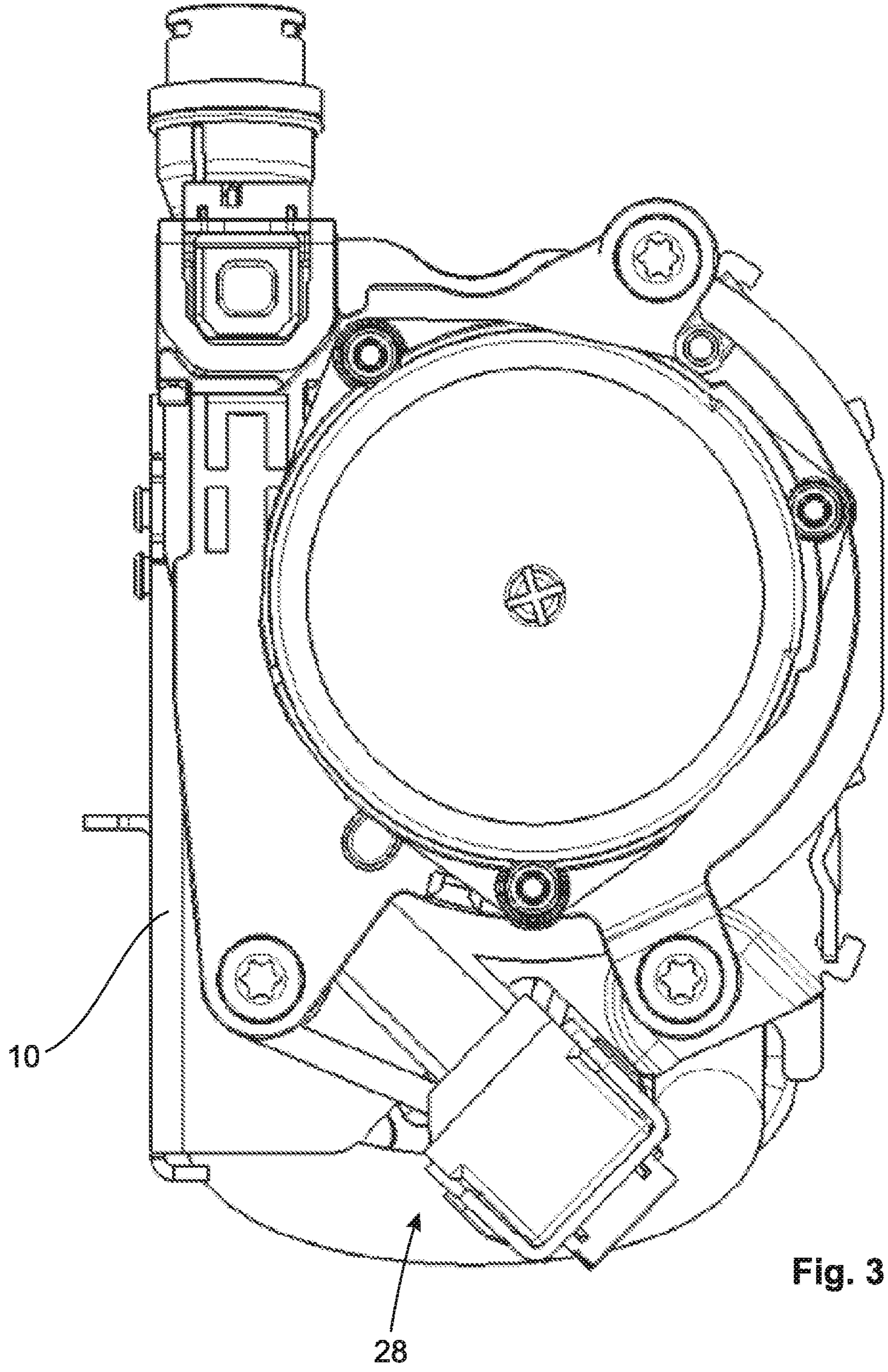
FIG. 3 shows a lateral view of the belt retractor of FIG. 1.
Figure 4:
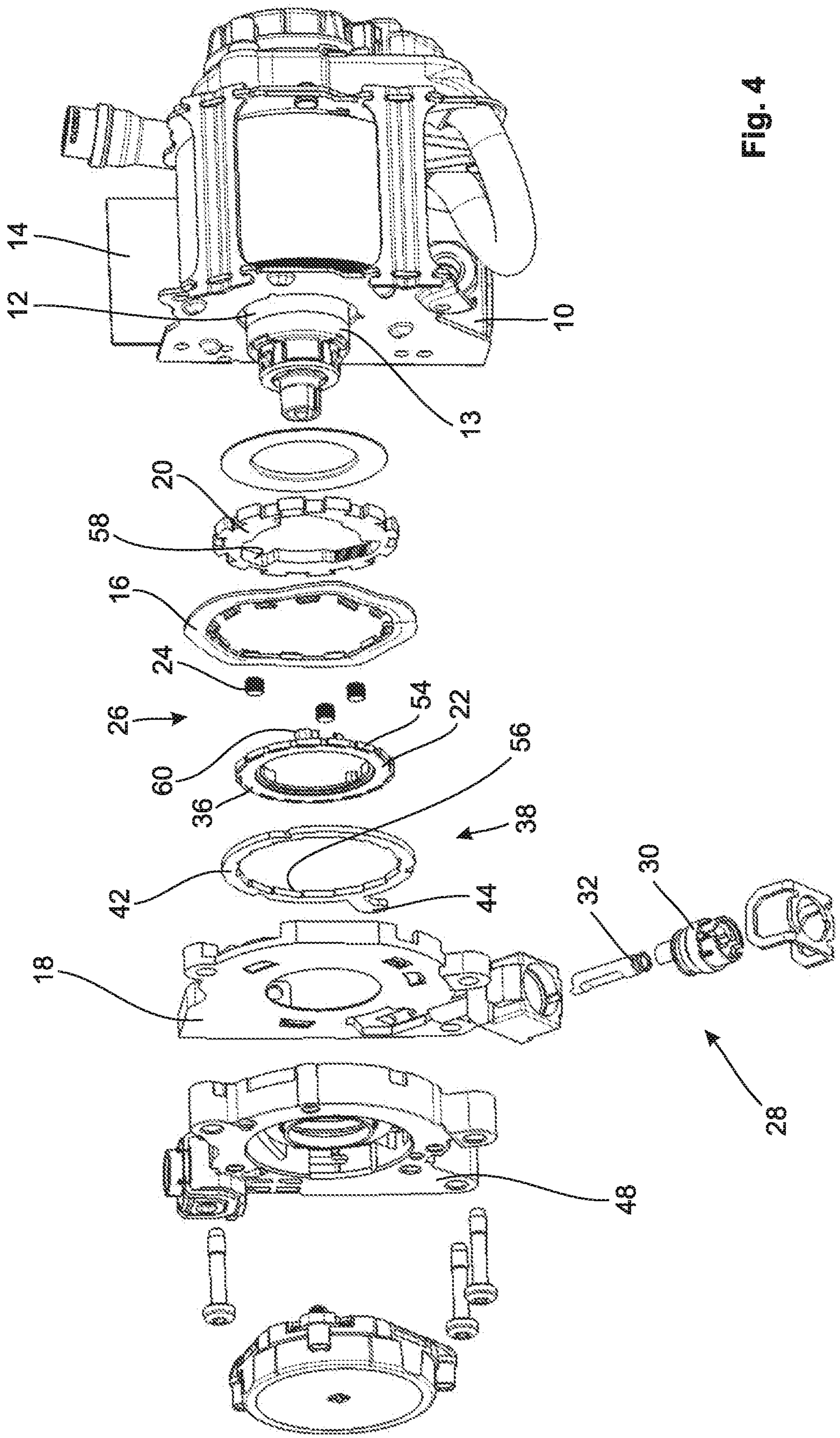
FIG. 4 shows an exploded view of the belt retractor of FIG. 1, with a load limiter being illustrated in detail.

Based on FIGS. 1 to 4, at first the general structure of the belt retractor will be explained.

The belt retractor includes a frame 10. A belt reel 12 is rotatably supported in the frame 10. In the Figures, a seat belt 14 is partly wound onto the belt reel 12. By means of the seat belt 14, a vehicle occupant of the vehicle in which the belt retractor is installed can be belted so that he/she participates in strong decelerations of the vehicle.

As far as hereinafter directional indications such as axial, radial or circumferential direction will be used, in case of doubt they relate to the axis of rotation of the belt reel.

The belt retractor includes plural load limiters by which a braking torque can be generated against which the belt reel 12 can be rotated so that the seat belt 14 can be extended from the belt retractor. This operation helps limit the loads acting on the seat belt 14 and, thus, on the vehicle occupant, if particularly high decelerations act on the vehicle.

In this case, only one of the load limiters is relevant so that the others shall not be explained in detail. The load limiter relevant here includes a shaft washer 16 which can be coupled to the belt reel 12 for a load limiting operation and, when being caught by the belt reel, provides the braking torque by a mixture of friction and deformation work.

The shaft washer 16 is guided within a peripheral passage. The passage is guided in wave shape, on the one hand, by an axial end face of the frame 10 with projections attached thereto and, on the other hand, by a housing 18 flanged to the end face of the frame 10 with projections and/or recesses provided thereto. The shaft washer 16 is approximately annular, and it encompasses a clutch cage 20. The shaft washer 16 is tightly coupled to the clutch cage 20 in the circumferential direction. The clutch cage 20 is generally annular and radially inside has recesses 58 which are narrowed in one direction and in each of which a driver 60 and a retaining finger 62 of a switching cage 22 engage. Between the driver 60 and the retaining finger 62 a coupling element 24 is received in each recess 58. The coupling elements 24 are rollers in this case.

The clutch cage 20 is received on a clamping surface 13 or a clamping shoulder, respectively, which is connected to co-rotate with or is formed integrally with the belt reel 12.

The clutch cage 20, the switching cage 22 and the coupling elements 24 form a switchable clutch 26 by means of which the shaft washer 16 can be tightly coupled to the clamping shoulder 13 of the belt reel 12 in one direction of rotation. The switching cage 22 is shiftable between an open position and a closed position by a rotation Rk.

In the open position of the switching cage 22, the coupling elements 24 do not act on the clamping shoulder 13 of the belt reel 12 in a load transmitting manner, as they are retained by the drivers 60 and the retaining fingers 62 of the switching cage 22 in the wide portion of the recesses 58. Therefore, the belt reel 12 is freely rotatable inside the clutch cage 20 in the open position of the clutch 26.

In the closed position of the switching cage 22, the coupling elements 24 are shifted to the narrow portion of the recesses 58 so that they get jammed between an inclined outer wall of the corresponding recess 58 and the outer surface of the clamping shoulder 13. For this reason, in the closed position of the coupling 26 a high torque can be transmitted from the belt reel 12 to the clutch cage 20, viz. in the direction of rotation in which the belt reel 12 rotates clockwise in the FIGS. 5 to 16. Said torque then can be transmitted to the shaft washer 16.

For activating the clutch 26, an actor 28 containing a micro gas generator 30 and a piston 32 in the shown embodiment is received in the housing 18. The housing 18 forms a cylinder 34 in which the piston 32 is movable. The switching cage 22 is shifted to the closed position by shifting the piston 32, under the effect of compression gas provided upon activation by the micro gas generator 30, from an initial position (see FIGS. 5 and 6) to an activated position in which it is spaced farther away from the micro gas generator 30 (see FIGS. 11 and 12).

The movement of the piston 32 is transmitted to the switching cage 22 by means of an actuator 38 and a freewheel 40 or a freewheel clutch, respectively, by which the switching cage 22 is carried in the direction toward the closed position of the clutch 26, but enables relative rotation in the opposite direction.

The actuator 38 is operatively connected to a main portion 36 of the switching cage 22 via the freewheel 40 so that an extension movement A of the piston 32 is translated to the shifting rotation Rk of the switching cage 22. When the piston 32 is in the standby position, the switching cage 22 is in the open position. When the piston 32 is in the extended position, the switching cage 22 is in the closed position.

In the embodiment shown in all Figures, the actuator 38 includes an annularly closed inner portion 42. Consequently, the actuator 38 is in the form of an adjusting collar or switching collar. The actuator 38 moreover has a cam 44 projecting purely radially from the inner portion 42. The actuator 38 in the present case is a flat plate. The actuator 38 preferably has the same thickness as the main portion 36 of the switching cage 22. Thus, the belt tensioner has an axially compact design. The cam 44 is axially guided in an indentation 46 of the housing 18. The indentation 46 is formed to have slitted portions and open portions.

Figure 5:
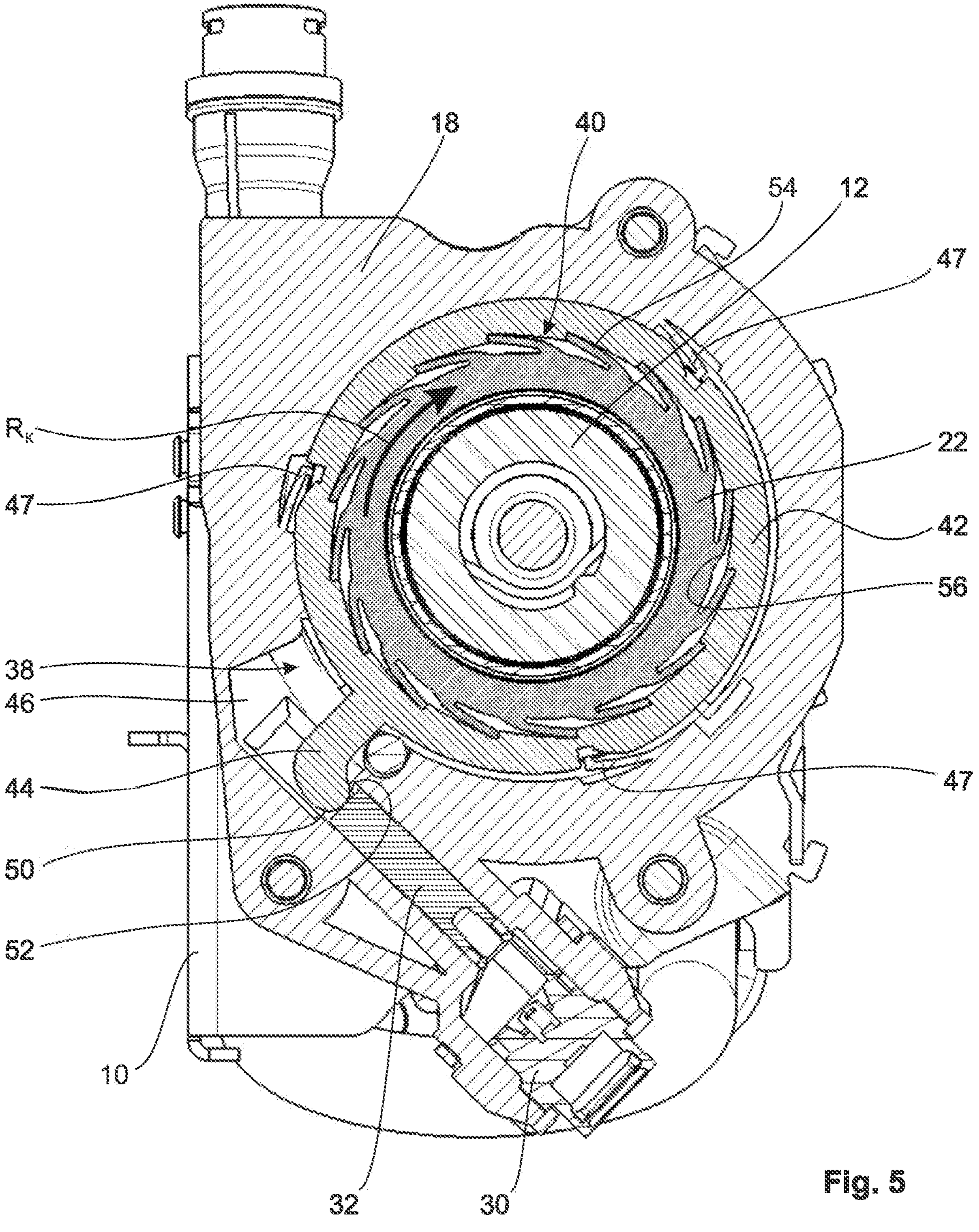
FIG. 5 and FIG. 6 show sectional views offset from each other of the belt retractor of FIG. 1 in a state in which a switching cage of the load limiter is in an open position.

The actuator 38 is maintained in an initial position shown in FIG. 5 by means of plural fixing tabs 47 each of which engages in a corresponding recess on the outer side of the annular main portion 36 of the actuator 36.

A housing part 48 is flanged to the housing 18.

The cam 44 is provided with a convex bearing face 50 the curvature of which interacts with an end face 52 of the piston 32 during the extension movement A of the piston 32 and, resp., the corresponding rotation Rs of the actuator 38. Since the end face 52 of the piston 32 abuts on the contact surface 50, the actuator 38 is forcedly caught when the piston is shifted in the direction A. Thus, the end face 52 and the contact surface 50 form a contact coupling. The actor 28 is put in the axial plane of the flat actuator 38 which results in an axially compact design of the belt tensioner.

The freewheel 40 is formed by at least one freewheel pawl 54 and one freewheel toothing 56 which are operatively engaged in each other.

The at least one freewheel pawl 54 is formed on an outer circumferential surface of the main portion 36 of the switching cage 22. The main portion 36 is in the form of a flat plate here which annularly surrounds the clamping shoulder 13 of the belt reel 12. The driver 60 and the retaining fingers 62 protrude from the main portion 36. The main portion 36 is disposed axially next to the clutch cage 20 so that the drivers 60 of the switching cage 22 protrude into the recesses 58 of the clutch cage 20.

The freewheel pawls 54 are formed integrally with the switching cage 22 in this case. The switching cage 22 may be configured together with the freewheel pawls 54 as an injection-molded part. The material is selected to be a suitable plastic material which results, on the one hand, in the desired strength and, on the other hand, in the required elasticity of the freewheel pawls 54.

The freewheel toothing 56 extends along an inner opening of the inner portion 42 of the actuator 38. An as high transmittable torque as possible is achieved by a plurality of freewheel pawls 54 being provided on the switching cage 22 and an identical number of teeth of the freewheel toothing 56 being provided on the inner portion 42. Accordingly, the freewheel pawls 54 and the teeth of the freewheel toothing 56 are respectively arranged uniformly in the circumferential direction. As a precaution, it is noted that the outer circumferential surface of the main portion 36 may be a purely constructive variable.

The freewheel toothing 56 is undercut in the direction of transmission so that a one-sided grating is resulting, causing the freewheel pawls 54 to be caught. This increases the transmittable torque in a self-reinforcing manner. An angle at which the freewheel pawls 54 project from the circumferential surface of the main portion 36 of the switching cage, a length of the freewheel pawls 54 and—put simply—the diameters of the outer circumferential surface of the main portion 36 and the freewheel toothing 56 are adapted to each other such that the individual freewheel pawls 54 project in the direction of transmission, when unloaded, about tangentially from the outer circumferential surface of the main portion 36. This increases the thrust force transferable for each freewheel pawl 54 and, thus, the transmittable torque.

The sectional views of the FIGS. 5, 7, 9, 11, 13 and 15 are located in a plane which illustrates the interaction of the actor 28, the actuator 38 and the freewheel 40. The sectional views of the FIGS. 6, 8, 10, 12, 14 and 16, on the other hand, are located behind the main portion 36 of the switching cage 22 in a plane in which the clutch comprising the clutch cage 20, the switching cage 22 and the coupling elements 24 is illustrated.

The FIGS. 5 to 10 illustrate in which way the actor 28 shifts the switching cage 22 to the closed position by means of the actuator 38.

Figure 6:
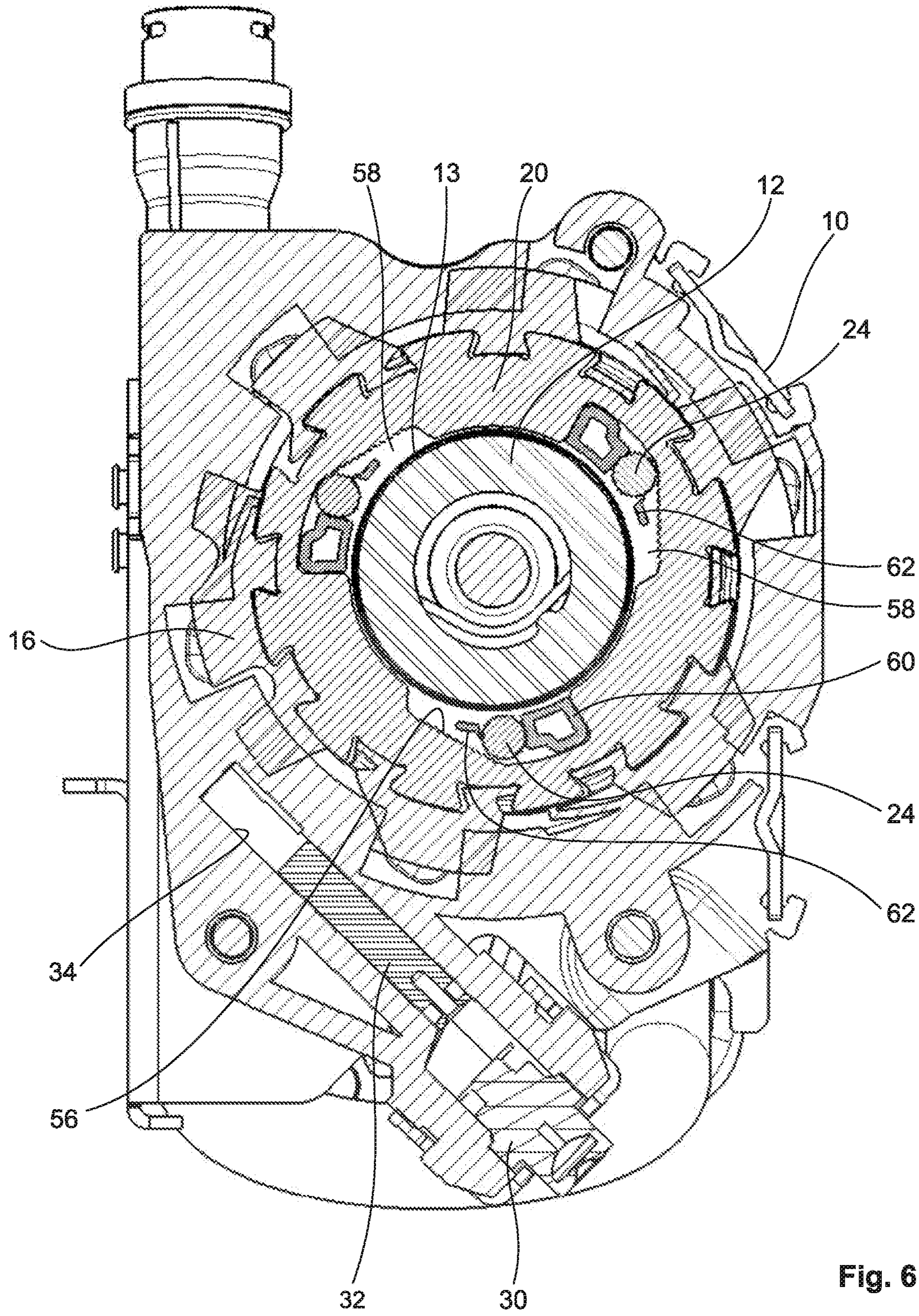

In the FIGS. 5 and 6, the initial state is shown. The belt reel can rotate freely relative to the clutch cage 20 and to the shaft washer 16, as the clutch 26 is opened.

Figure 7:
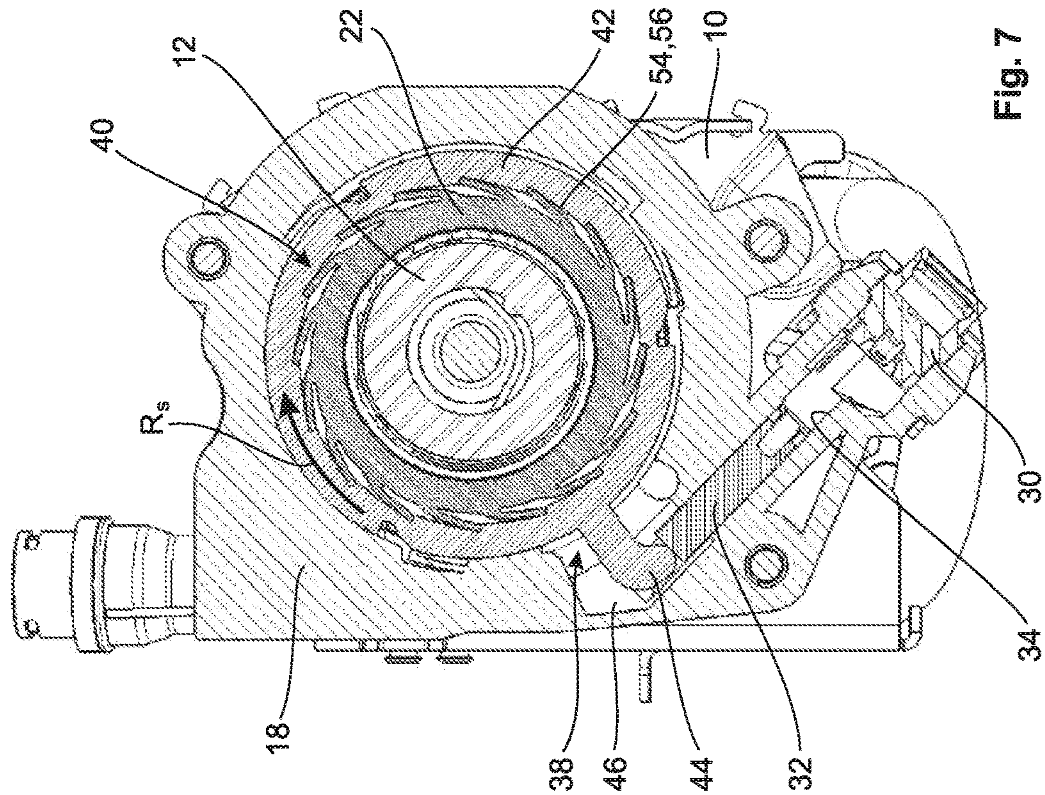
FIG. 7 and FIG. 8 show the offset sectional views of the belt retractor of FIG. 1 in a state in which an actor shifts the switching cage from the open position to a closed position by means of an actuator via a freewheel.
Figure 8:
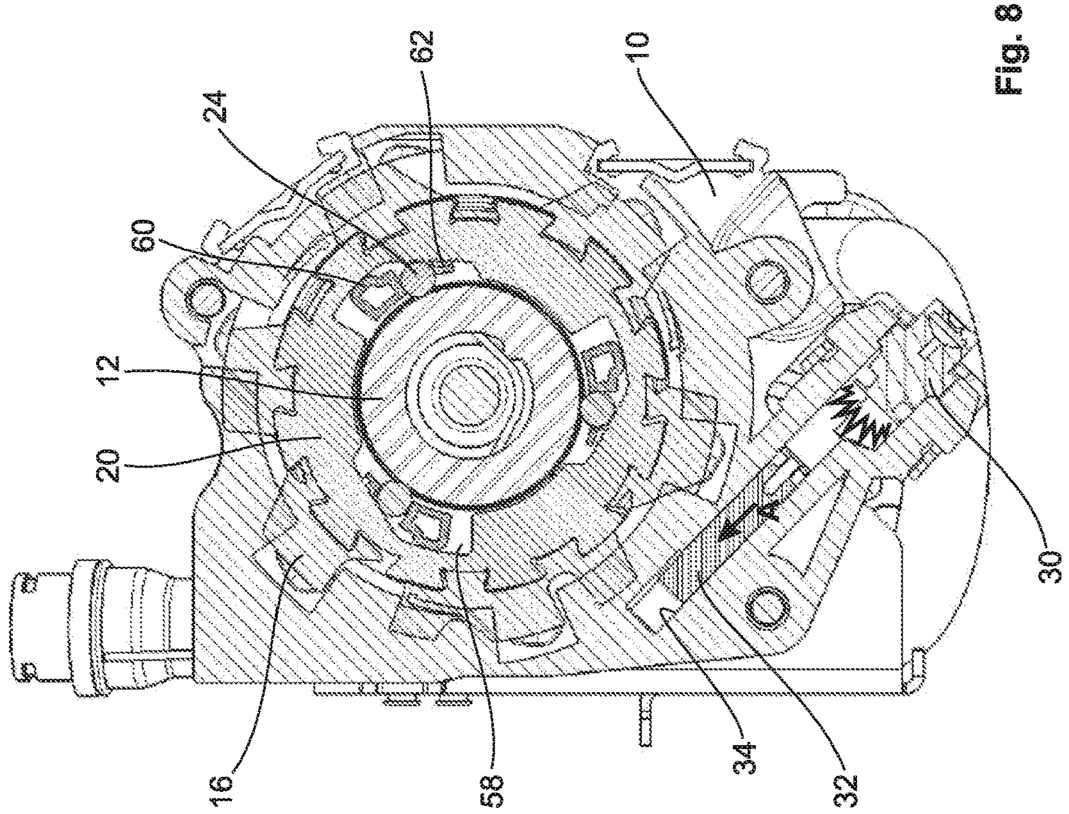

FIGS. 7 and 8 show the state in which the micro gas generator 30 is triggered. The clutch continues being in the opened state.

Figure 9:
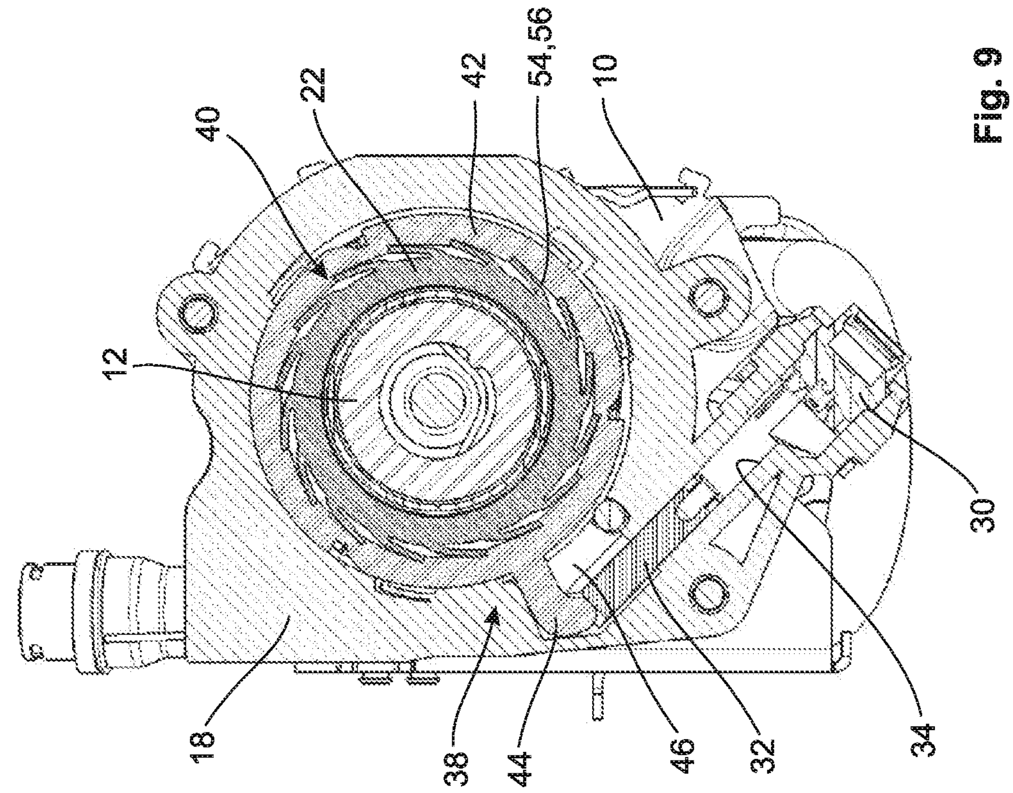
FIG. 9 and FIG. 10 show the offset sectional views of the belt retractor of FIG. 1 in a state in which the switching cage has already been shifted to the closed position and the freewheel does not yet run freely.
Figure 10:
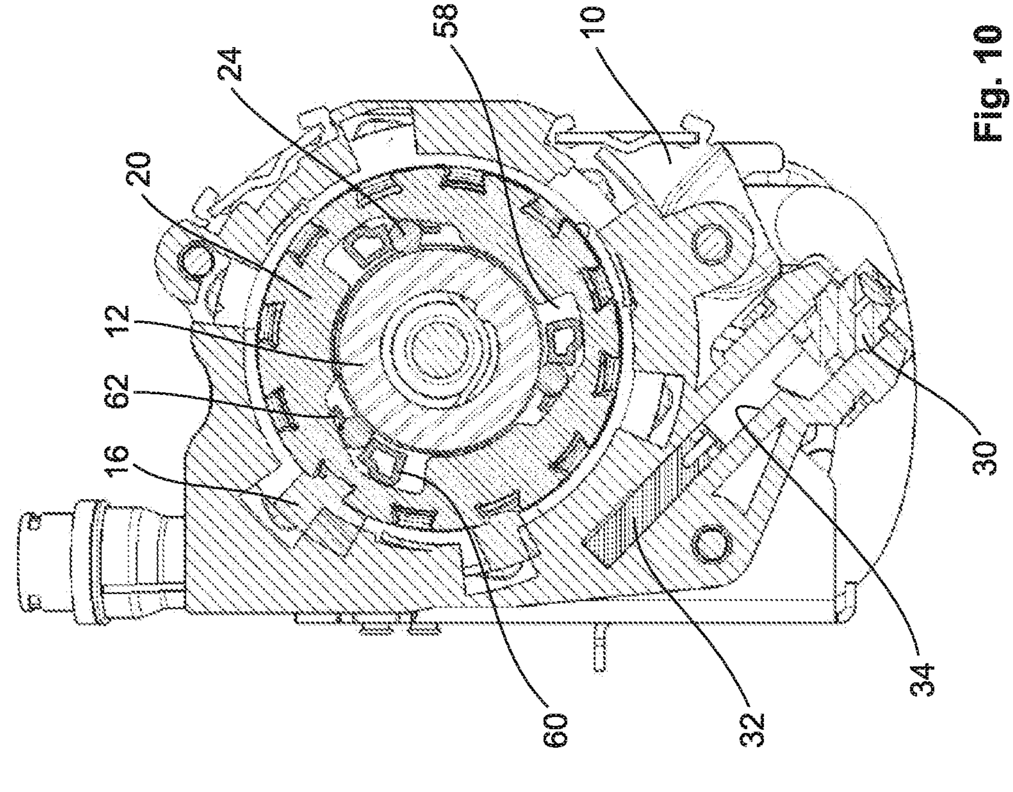

In the FIGS. 9 and 10, the piston 32 has carried the actuator 38 and, thus, the switching cage 22 via the freewheel 40 so that the coupling elements 24 are located between the inclined outer wall of the recess 58 and the cylindrical outer surface of the clamping shoulder 13. The clutch 26 therefore is closed and a clockwise rotation of the belt reel 12 is transmitted via the coupling elements 24 to the clutch cage 20 and, consequently, to the shaft washer 16.

For the purpose of operational safety, the angle required to move the switching cage 22 during the rotation Rk to the position in which the clutch 26 is closed is preferably smaller than or equal to the angle about which the actuator 38 rotates during the rotation Rs, while the piston 32 extends from the standby position to the activated position.

Figure 11:
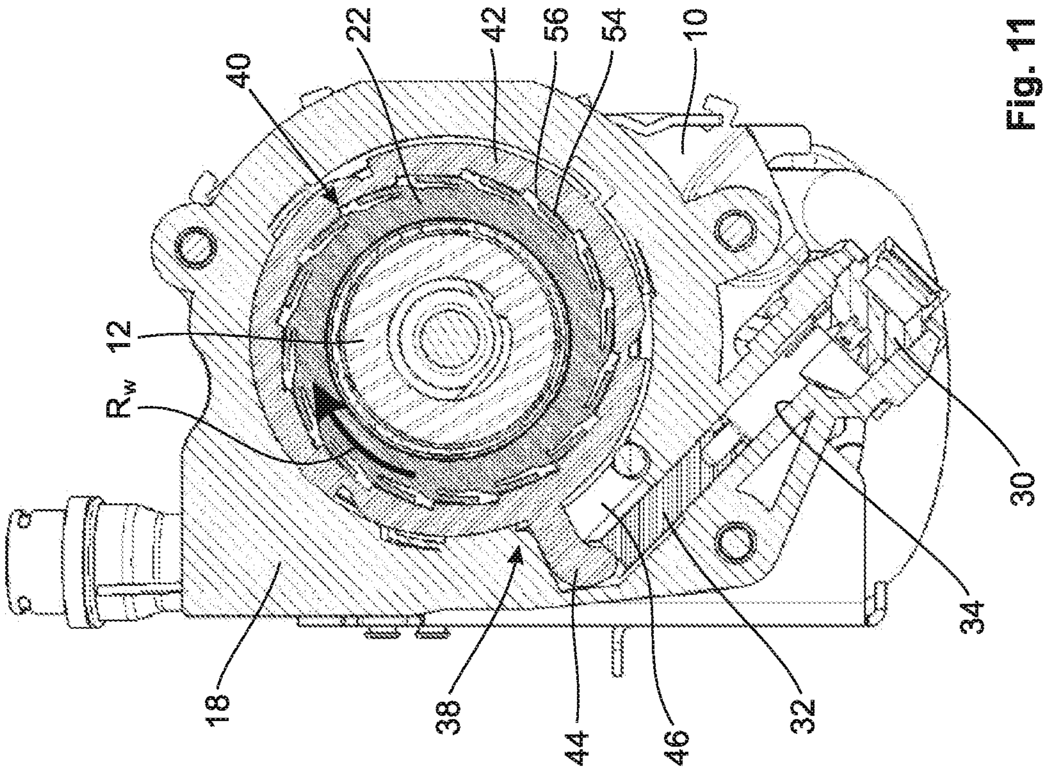
FIG. 11 to FIG. 16 show the offset sectional views of the belt retractor in FIG. 1 in three states in which the switching cage is shifted to the closed position and the freewheel runs freely.
Figure 12:
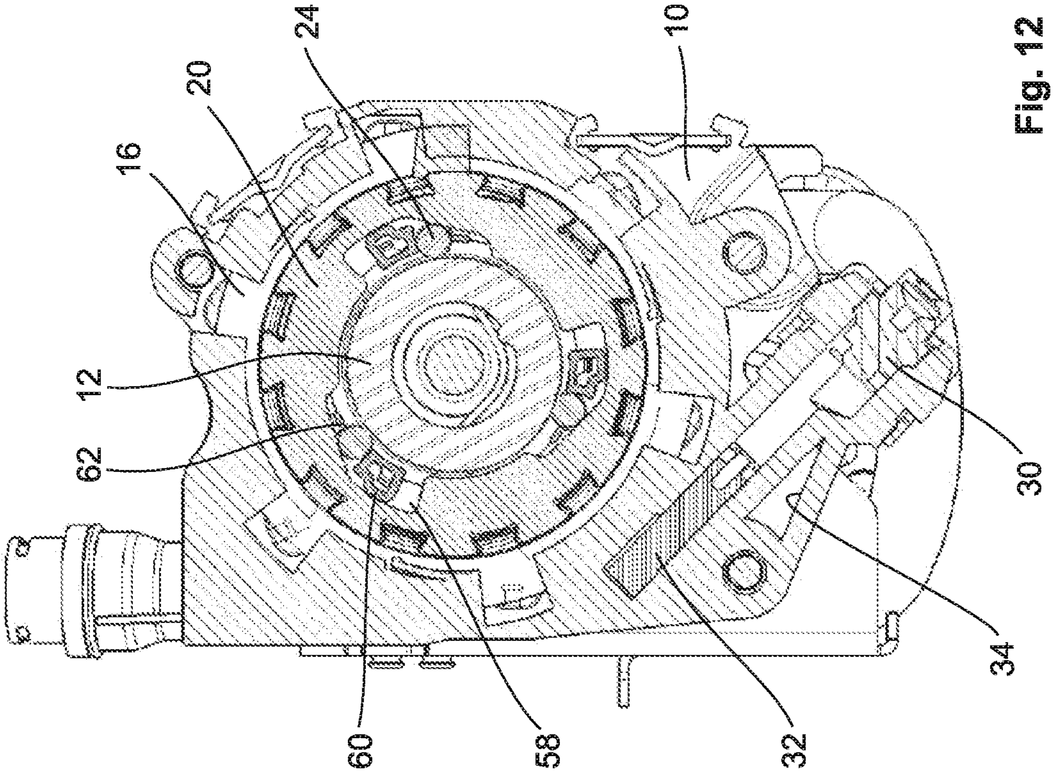

FIGS. 11 and 12 illustrate the belt retractor in a state of load limitation in which the belt reel 12 is rotated clockwise under the effect of high tensile force in the seat belt 14. In so doing, the clutch cage 20 is carried along, thus causing the switching cage 22 to be also carried along. It is visible that the tips of the freewheel pawls have somewhat removed from the contact surface opposed thereto. The freewheel pawls 54 are resiliently bent radially inwards when they slide on the toothing.

It is evident from FIG. 11 that the freewheel pawls 54 attached to the switching cage 22 are carried along and rotate relative to the actuator 38; the actuator 38 remains in its position and need not jointly rotate due to the freewheel 40.

Figure 13:
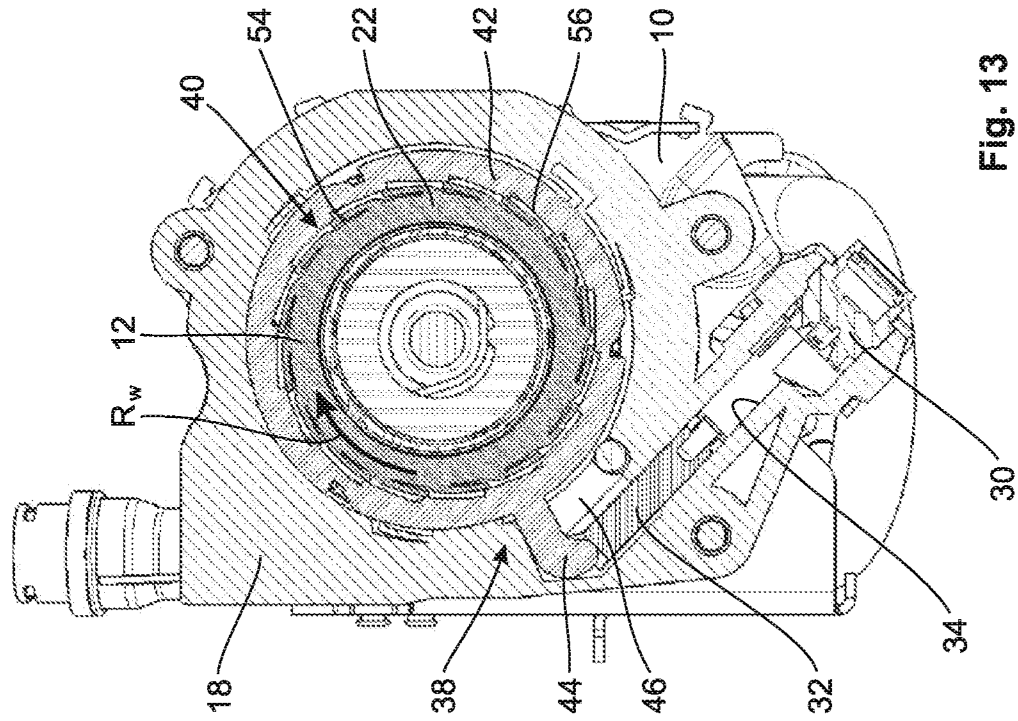
Figure 14:
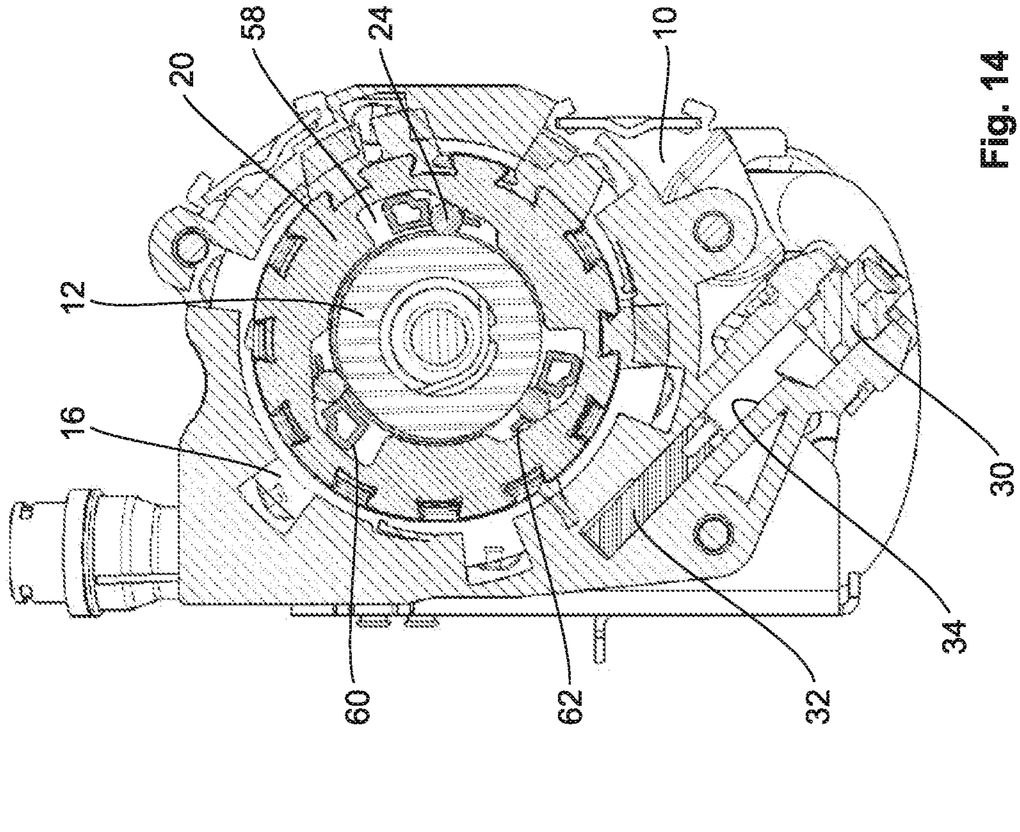

In the state shown in the FIGS. 13 and 14, the switching cage 22 and the freewheel pawls 54 have rotated a little further. It is visible that the freewheel pawls have almost reached the next contact surface of the toothing and, thus, have rotated further by almost one pitch.

Figure 15:
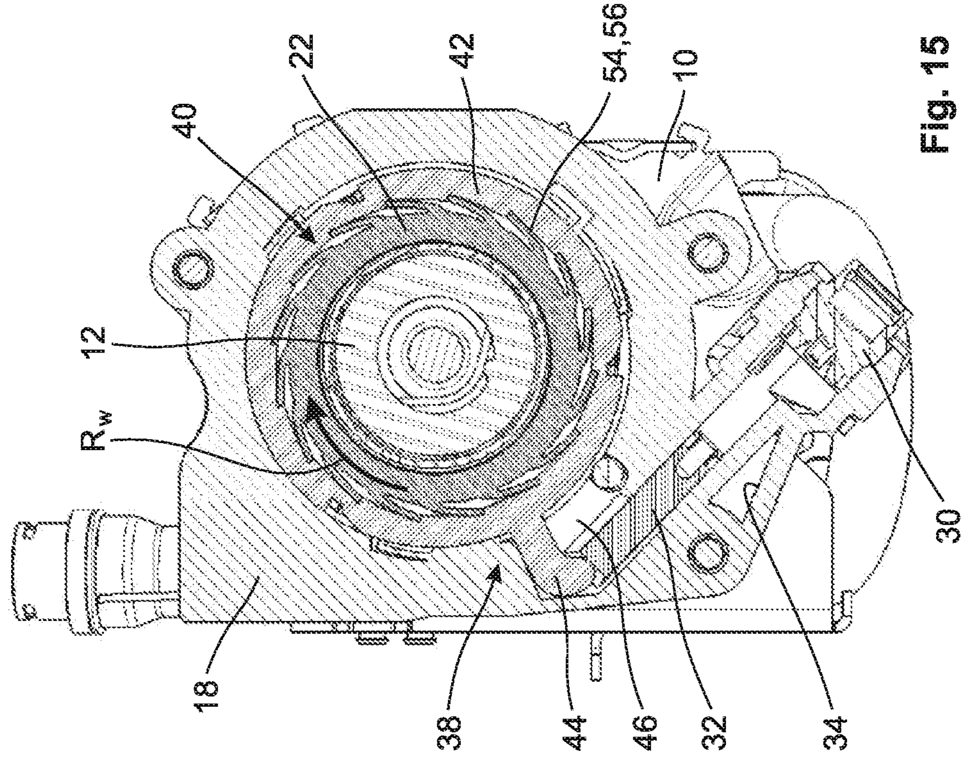
Figure 16:
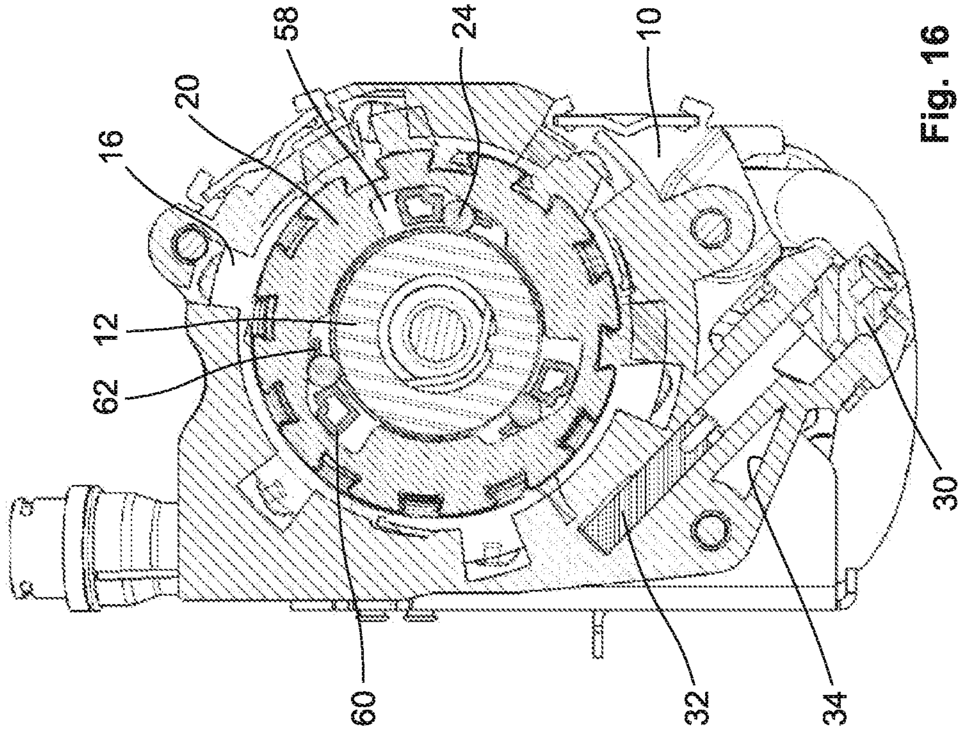

In the state shown in the FIGS. 15 and 16, the switching cage 22 and the freewheel pawls 54 have rotated further relative to the initial state of the FIGS. 9 and 10 by one tooth pitch so that the freewheel pawls 54 can snap outwards again. This is repeated as long as the belt reel 12 is coupled via the clutch to the shaft washer 16 and carries the same along.

In total, the FIGS. 11 to 16 illustrate an overtaking rotation of the freewheel 40, i.e., a free-running further rotation Rw of the closed switching cage 22.

The invention claimed is:

1. A belt retractor comprising a frame (10), a belt reel (12) which is rotatably arranged in the frame (10) and can receive a seat belt (14), at least one load limiter (16) which enables the belt reel (12), when it overcomes a braking torque provided by the load limiter (16), to rotate relative to the frame (10) so as to release seat belt (14), and a switchable clutch (26) including a switching cage (22) and coupling elements (24), wherein the switching cage (22) is shifted, by an actor (28), from an open position in which the coupling elements (24) are maintained disengaged from the belt reel (12) to a closed position in which the coupling elements (24) engage the belt reel (12), wherein an actuator (38) is arranged to be rotated relative to the frame and the belt reel by the actor (28), and wherein a freewheel (40) directly couples the switching cage (22) to the actuator (38) so that the actuator (38) and the switching cage rotate together relative to the frame and belt reel and the actuator shifts the switching cage (22) from the open position to the closed position when the actuator rotates relative to the frame and belt reel, the freewheel permitting rotation of the switching cage relative to the actuator in a first direction and preventing rotation of the switching cage relative to the actuator in a second direction opposite the first direction.

2. The belt retractor according to claim 1, wherein the actuator (38) is a flat plate.

3. The belt retractor according to claim 1, wherein the switching cage (22) includes at least one freewheel pawl (54) interacting with a freewheel toothing (56) provided on the actuator (38).

4. The belt retractor according to claim 3, wherein the switching cage (22) includes a plurality of freewheel pawls (54) which are arranged uniformly in the circumferential direction.

5. The belt retractor according to claim 3, wherein the switching cage (22) is made of plastic material and the freewheel pawls (54) are formed integrally with the switching cage (22).

6. The belt retractor according to claim 3, wherein the freewheel toothing (56) is configured to be undercut.

7. The belt retractor according to claim 3, wherein the actuator (38) is an adjusting collar and the freewheel toothing (56) is an internal toothing extending along an inner opening of the adjusting collar.

8. The belt retractor according to claim 3, wherein the number of the freewheel pawls (54) and the number of the teeth of the freewheel toothing (56) are identical.

9. The belt retractor according to claim 1, wherein the actuator (38) is supported between a housing (18) of the actor (28) and the switching cage (22).

10. The belt retractor according to claim 9, wherein the housing (18) of the actor includes a flat indentation (46) in which the actuator (38) is disposed.

11. The belt retractor according to claim 1, wherein the belt reel is rotatable relative to the switching cage and the load limiter when the switching cage is in the open position, the switching cage and the load limiter being rotatable with the belt reel relative to the frame when the switching cage is in the closed position.

12. The belt retractor according to claim 3, wherein the at least one freewheel pawl and the freewheel toothing prevents rotation of the switching cage relative to the actuator in a first direction and permits rotation of the switching cage relative to the actuator in a second direction opposite the first direction.

13. A belt retractor comprising:

a frame;

a belt reel rotatably arranged in the frame;

at least one load limiter which enables the belt reel to rotate relative to the frame when a braking torque provided by the load limiter is overcome;

a switchable clutch including a switching cage and coupling elements, the switching cage having an open position in which the coupling elements are disengaged from the belt reel and a closed position in which the coupling elements engage the belt reel, the belt reel being rotatable relative to the switching cage and the load limiter when the switching cage is in the open position, the switching cage and the load limiter being rotatable with the belt reel relative to the frame when the switching cage is in the closed position;

an actuator rotatable relative to the frame to move the switching cage from the open position to the closed position, the switching cage being directly coupled to the actuator by a freewheel, the freewheel permitting the actuator to rotate relative to the switching cage in a first direction and preventing the actuator from rotating relative to the switching cage in a second direction opposite the first direction; and an actor that engages the actuator to rotate the actuator relative to the frame and shift the switching cage from the open position to the closed position.

14. The belt retractor according to claim 13, wherein the switching cage includes at least one freewheel pawl interacting with a freewheel toothing of the actuator, the at least one freewheel pawl and freewheel toothing preventing rotation of the switching cage relative to the actuator in a first direction and permitting rotation of the switching cage relative to the actuator in a second direction opposite the first direction.

15. The belt retractor according to claim 13, wherein the actuator is a flat plate.

16. The belt retractor according to claim 13, wherein the switchable clutch includes a clutch cage, the load limiter being connected to the clutch cage for rotation with the clutch cage relative to the frame, the switching cage being rotatable relative to the clutch cage from the open position to the closed position, the clutch cage causing the coupling elements to engage the belt reel when the switching cage is in the closed position, the clutch cage and switching cage rotating with the belt reel when the switching cage is in the closed position.

17. The belt retractor according to claim 1, wherein the switchable clutch includes a clutch cage, the load limiter being connected to the clutch cage for rotation with the clutch cage relative to the frame, the switching cage being rotatable relative to the clutch cage from the open position to the closed position, the clutch cage causing the coupling elements to engage the belt reel when the switching cage is in the closed position, the clutch cage and switching cage rotating with the belt reel when the switching cage is in the closed position.

* * * * *